April 12, 1960  E. R. LUPIN  2,932,257
HYDRAULIC ACTUATING SYSTEM
Filed Feb. 13, 1957
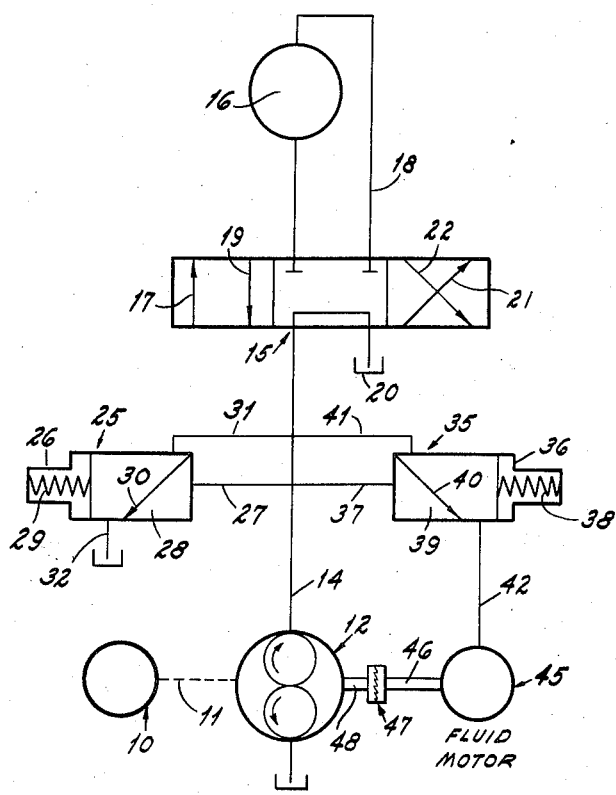
INVENTOR.
ELI R. LUPIN
BY Hiram P. Settle, Jr.
ATTORNEY United States Patent Office 2,932,257
Patented Apr. 12, 1960

2,932,257

HYDRAULIC ACTUATING SYSTEM

Eli R. Lupin, Royal Oak, Mich.

Application February 13, 1957, Serial No. 637,726

3 Claims. (Cl. 103—207)

The present invention relates to a hydraulic actuating system and, more particularly, to such a system wherein pressure fluid is by-passed to a feed-back drive to increase the over-all efficiency of the system.

In conventional hydraulic actuating systems, pressure fluid generally is supplied to an output element, such as a fluid motor, at a pressure governed by the setting of a relief valve interposed in the source-to-element line. The source of pressure fluid is generally a constant displacement pump, and the output pressure of the pump depends upon the work demand at the output element. When the load on the output element becomes so great as to cause an increase in the pressure delivery from the pump to a predetermined degree, the relief valve opens to vent excessive fluid flow from the pump to the sump or other fluid reservoir. The relief valve is actuated by pressure in the source-to-motor line, and the dumping of relatively high pressure fluid through the relief valve causes the generation of substantial heat. To cool fluid by-passed through a relief valve, a reservoir must be provided. Also, where large displacement pumps are required for rapid actuation of the output element, excessive flow through the relief valve will result, requiring even larger reservoirs and increased cooling capacity.

The present invention provides a new, novel, and highly efficient hydraulic actuating system which substantially reduces the flow of pressure fluid through a relief valve, which aids in the driving of the pump or other pressure source, and which substantially reduces heat generation at the relief valve.

More particularly, the present invention proposes the utilization of a feed-back drive wherein an adidtional fluid motor is coupled to the pump or pressure source, this fluid motor being driven by fluid by-passed from the source-to-motor line whenever a predetermined minimum pressure, the same or less than relief pressure, exists in the source-to-motor line.

It is, therefore, an important object of the present invention to provide an improved hydraulic actuating system.

Another object is the provision of a hydraulic actuating system utilizing a fluid by-pass to a feed-back pump drive to substantially reduce flow through a relief valve and to aid in driving the pump.

It is a further important object of this invention to provide a hydraulic actuating system wherein excess volumetric pump delivery at a predetermined pressure is by-passed through a supplementary pump drive to aid in driving the pump while substantially reducing fluid flow through a relief valve.

A further important object is the provision of a hydraulic actuating system having a constant delivery pump adapted to supply pressure fluid to an output element and incorporating a feed-back drive for the pump whereby excess volume delivery of the pump is utilized to drive a fluid motor coupled to the pump, the fluid motor having a displacement less than that of the pump.

It is yet another object of this invention to provide a fluid pressure source connected to an output element, the auxiliary drive including a fluid motor adapted to receive pressure fluid from the pump at a predetermined minimum pressure, the motor having a displacement less than the pump and being drivingly coupled to the pump.

These and other objects will be more apparent from the following detailed description of a preferred embodiment of this invention and by reference to the drawing forming a part thereof, wherein:

On the drawing:

The single figure of the drawing indicates schematically the hydraulic actuating system of the present invention.

As shown on the drawing:

Reference numeral 10 refers generally to a source of power, such as an electric motor, internal combustion engine, or similar source, which is drivingly coupled, as indicated at 11, to a constant displacement pump 12.

The illustrated pump 12 is of the gear type, although any desired type of pump may be utilized. The pump 12 is adapted to discharge, as through a line 14, and a valve 15 to an output element 16. The output element 16 preferably is a fluid motor of either the piston-and-cylinder type or of the rotary type.

The valve 15 is illustrated in its "off" position wherein no flow from the pump 12 through the line 14 to the motor 16 is accommodated. Displacement of the valve 15 to the right will align valve passage 17 with the pump discharge line 14 to accommodate the flow of pressure fluid to one side of the motor 16, the other side of the motor being vented through discharge line 18 and valve passage 19 to a sump 20 at atmospheric pressure. If the motor 16 is of the double acting type, the valve 15 may be moved to its furthest left-hand position to interconnect lines 14 and 18, through valve line 21, and to connect pressure line 14 to the sump 20 through valve passage 22, thereby reversing the operation of the output element 16.

A relief valve 25 is provided to limit the maximum pressure developed in the line 14. This relief valve 25 comprises an exterior casing 26 connected to the pressure of line 14 through line 27 and a relief valve body 28 disposed in the casing for transverse movement. The valve body 28 is urged to the right, i.e., against the pressure in line 27, by a compression spring 29. Valve body 28 is provided with a fluid flow passage 30 alignable with relief flow passage 31 and sump line 32 when the pressure in the line 27 overcomes the mechanical pressure of the spring 29.

Thus, the valve 25 will be effective to vent excess fluid flow from the pump 12 and in the line 14 to atmosphere when the pressure in the line 14 forces the relief valve 25 open.

A by-pass valve 35 is also provided, the valve 35 being substantially similar in structure and function to the valve 25. More particularly, the valve 35 is slidably disposed within a casing 36 adapted to receive fluid pressure through line 37, which pressure acting against compression spring 38 will force the valve body 39 to the right. When sufficient pressure is generated in the lines 14 and 37 to overcome the pressure of the spring 38, the valve is shifted so that valve passage 40 interconnects bypass line 41 and a fluid motor supply line 42.

The motor supply line 42 is adapted to supply fluid pressure to a fluid motor 45, preferably of the rotary type, although a linearly displaceable piston and cylinder type motor may be utilized if desired. The output shaft 46 of the motor 45 is connected through a one-way clutch 47 to a drive shaft 48 for the pump 12. The one-way clutch 47 is effective to transmit drive from the motor output shaft 46 to the pump input shaft 48, but is not effective to transmit driving force from the pump shaft 48 to the motor shaft 46. Such clutches are well known in the art.

In the operation of the device illustrated in the drawing, it is essential that the displacement of the motor 45 be less than the displacement of the pump 12, such displacement being calculated volumetrically per revolution. Let us assume that the pump displacement is 10 gallons per minute while the displacement of the fluid motor 45 is 7 gallons per minute. Also, let us assume that the relief valve 25 is set at 1800 lbs. per square inch, that is, a pressure of 1800 lbs. per square inch is required in the line 27 to overcome the bias of the spring 29, while the by-pass valve 35 has a setting of 1500 p.s.i., that is, 1500 lbs. per square inch presure in the line 37 is required to overcome the bias of the spring 38. Upon initially starting the system, and until the line 14 is filled, and/or until resistance to operation of the motor 16 attains the required value, the pressure in line 14 will remain below that necessary to actuate the by-pass valve. Once a pressure of 1500 p.s.i. has been obtained in the line 14, the by-pass valve 35 will be actuated against the pressure of its spring 38 so that fluid will be by-passed from the line 14 through line 41, passage 40 and line 42 to the fluid motor 45. This pressure will actuate the motor 45, so that it will aid in driving the pump 12 through the shafts 46 and 48. It is obvious that any such drive torque applied to the shaft 48 will lessen the driving requirements imposed upon the source 10.

Assuming that the resistance to movement of the rotor 16 is of such an order that the pressure in line 14 attains the relief valve pressure of 1800 p.s.i., the valve 25 will be actuated to interconnect the relief line 31 through the valve pressure 30 to the sump line 32. At this time, full flow will be accommodated from the pump 12 through the by-pass line 41 and the valve 35 to the motor 45. Assuming that the motor 16 has reached a full stall condition at which no pump volume is being supplied to the motor, the 10 gallons per minute volumetric output of the pump will be delivered entirely through the by-pass line 41 and the relief valve line 31. Since the fluid motor has a capacity of 7 gallons per minute, only three gallons per minute will be delivered through the relief valve at the relief valve pressure of 1800 p.s.i. If the by-pass line 41, the by-pass valve 35, and the feed-back motor 45 were not provided, then 10 gallons per minute must be passed through the relief valve 25. The consequent saving in heat generation at the relief valve, the lowered power requirements for the source 10, and the increased efficiency of the system will be readily appreciated.

If desired, the by-pass valve 35 may be set to open at any pressure equal to or less than the relief valve pressure, and the displacement of the fluid motor 45 may be varied substantially, so long as its displacement is less than the displacement of the pump 12.

It will be readily understood that the present invention provides a hydraulic actuating system wherein less heat is generated in the relief valve, and the cooling reservoir requirements are substantially lessened. Additionally, the power input from the source 10 is substantially reduced, inasmuch as the driving feed-back for the pump 12 through the fluid motor 45 aids materially in supplying the power requirements of the pump. The maximum power demands of the pump 12 are developed when the pump is discharging against the relief valve pressure or in the area of relief valve pressure, and this is exactly the point at which the fluid motor 45 becomes effective to aid in driving the pump 12. Further, this arrangement makes possible the use of a large displacement pump 12 to accommodate rapid traverse operation, or other operation, of the output motor 16 without requiring excessive flow through the relief valve 25 when the system is operating at or near relief valve pressure.

While a preferred embodiment of my invention has been described above in detail, it will be understood that numerous modifications may be resorted to without departing from the scope of the following claims.

I claim:

1. In a fluid pressure actuating system, a pump for discharging fluid under pressure, means for driving said pump, a fluid conduit receiving fluid under pressure from said pump, a relief valve subject to the fluid pressure in said conduit and actuatable at a predetermined maximum pressure to by-pass fluid to a sump, a supplementary fluid motor coupled to said pump to aid in driving the pump, and a by-pass valve interposed between said conduit and said motor to vent fluid under pressure from said conduit to said supplementary motor at a predetermined minimum pressure in said conduit not greater than the actuating pressure of said relief valve.

2. In a fluid pressure actuating system, a constant displacement pump, power means for driving said pump, an output conduit receiving pressure fluid from said pump, pressure relief means vented to said conduit and relieving pressures therein on excess of a predetermined maximum, fluid by-pass means actuatable at conduit pressures less than said predetermined maximum pressure, fluid-driven means receiving by-pass fluid from said pump, the volumetric capacity of said fluid-driven means being less than the displacement of said pump, and a one-way clutch coupling said fluid-driven means to said pump.

3. In a fluid pressure actuating system, a pump, a prime mover drivingly coupled to said pump, a fluid pressure conduit connected to the output of said pump, a relief valve connected to said conduit operable in response to selected pressure in said conduit to by-pass fluid to a sump, a fluid motor drivingly coupled to said pump, and a by-pass valve connected to said conduit operable in response to selected pressure in said conduit lower than the relief valve operating pressure to by-pass fluid from said conduit to said fluid motor.

References Cited in the file of this patent

UNITED STATES PATENTS

| | | |
|---|---|---|
| 1,829,655 | Huguenin | Oct. 27, 1931 |
| 1,968,700 | Milotta | July 31, 1934 |
| 2,055,390 | Rouch | Sept. 22, 1936 |
| 2,562,762 | Beasley | July 31, 1951 |
| 2,828,066 | Wellauer | Mar. 25, 1958 |